United States Patent
Tam et al.

(10) Patent No.: US 8,350,533 B2
(45) Date of Patent: Jan. 8, 2013

(54) PORTABLE ELECTRONIC DEVICE HAVING AUTOMATIC LOW TEMPERATURE BATTERY CHARGING CAPABILITY

(75) Inventors: Ching Yu John Tam, Los Gatos, CA (US); Parin Patel, Walnut Creek, CA (US)

(73) Assignee: Apple Inc., Cupertino, CA (US)

( * ) Notice: Subject to any disclaimer, the term of this patent is extended or adjusted under 35 U.S.C. 154(b) by 336 days.

(21) Appl. No.: 12/434,957

(22) Filed: May 4, 2009

(65) Prior Publication Data

US 2010/0277128 A1    Nov. 4, 2010

(51) Int. Cl.
H02J 7/04    (2006.01)
(52) U.S. Cl. .................... 320/150; 320/153; 320/144
(58) Field of Classification Search .................. 320/150, 320/153, 144
See application file for complete search history.

(56) References Cited

U.S. PATENT DOCUMENTS

| | | | |
|---|---|---|---|
| 4,385,269 A * | 5/1983 | Aspinwall et al. ............ | 320/129 |
| 5,254,928 A | 10/1993 | Young | |
| 5,410,238 A | 4/1995 | Ishizuka et al. | |
| 7,525,290 B2 * | 4/2009 | Miyata .......................... | 320/160 |
| 7,721,132 B2 * | 5/2010 | Nakai ............................ | 713/340 |
| 2006/0022646 A1 * | 2/2006 | Moore et al. .................. | 320/150 |
| 2009/0035609 A1 | 2/2009 | Ludtke | |
| 2009/0167253 A1 * | 7/2009 | Muraoka et al. .............. | 320/152 |
| 2009/0289603 A1 * | 11/2009 | Mahowald .................... | 320/151 |

OTHER PUBLICATIONS

Phone says "Battery temperature is too cold" palm treo 750, at&t, Palm—Wireless Forums from AT&T, Jul. 2008, Internet download at: http://forums.wireless.att.com/cng/board/message?board.id=palm&message.id-13452&query.id=183897#M13452, (5 pages).

* cited by examiner

*Primary Examiner* — Patrick Assouad
*Assistant Examiner* — Alesa Allgood
(74) *Attorney, Agent, or Firm* — Blakely, Sokoloff, Taylor & Zafman LLP

(57) ABSTRACT

A controller detects the temperature of a portable electronic device as being below a battery charging threshold, and in response signals one or more of the electronic circuit components that make up the device to enter an increased power consumption state so as to generate more heat in the device for warming up the battery. Other embodiments are also described and claimed.

27 Claims, 6 Drawing Sheets

PORTABLE ELECTRONIC DEVICE HAVING AUTOMATIC LOW TEMPERATURE BATTERY CHARGING CAPABILITY

An embodiment of the invention relates to charging the battery of a multi-function smart phone. Other embodiments are also described.

BACKGROUND

Consumer grade portable electronic devices such as multi-function smart phones, laptop personal computers, and dedicated navigation devices typically use lithium ion, Li-ion, or lithium polymer, LiPo, based rechargeable batteries as their primary power source. Such batteries have relatively high energy-to-weight ratios, making them well suited for portable applications. However, they are more "delicate" than other battery chemistries. In particular, to maintain their longevity or reliability, most Li-ion cells should be charged at a lower current when the cell temperature is down at 5° C. (41° F.) or colder. In addition, charging at below freezing is to be avoided because permanent damage to the internal structure of the cell could occur. For this reason, a typical portable electronic device has a temperature sensor and a charging circuit that automatically prevents its battery from being charged when it is too cold. Thus, for example, if a user has left the device in his car overnight while the ambient temperature has dropped to below freezing, it may take a long time before the battery is fully charged (depending on how quickly the device can be brought up to a minimum charging temperature).

SUMMARY

An embodiment of the invention is a portable electronic device that better manages the task of charging its battery at low temperatures. The device has a controller that can detect when the device is coupled to an external power source, and that a temperature of the device is too low (for purposes of charging the battery, for example at a given charge rate). In response, the controller signals a data processor (or other suitable electronic circuit component of the device that can generate sufficient heat to warm up the battery) to increase its activity. In other words, the data processor is signaled to increase its power consumption, by for example entering into a special execution subroutine or a typical application that tends to be power-hungry, to generate more heat in the device and thereby raise the overall temperature of the device more quickly. The controller may allow this increase in activity to persist, until the battery is brought up to its charging cutoff or other threshold temperature, at which point the charge current can be increased (to for example its nominal or room temperature level). This may be expected to result in the battery becoming fully charged more quickly while reducing the risk of long-term damage to the battery. In addition, the process may occur without requiring the user to take any action other than coupling the device to the external power source.

In another embodiment, the controller adjusts the increase in activity or power consumption of the components that are acting as heaters (while the battery is being charged) so that power consumption by the rest of the device remains less than the total available power from the external power source. In this manner, where the external power source has a relatively limited amount of available power, at least some of that available power is steered to the battery. This ensures that the battery is receiving a net positive charge, despite being asked to simultaneously power the rest of the device (including the components that are being "overdriven" to act as heaters).

The controller may also be given more granular control of, in effect, how much of the available power is diverted to power the components that are acting as heaters, and how much is diverted to charge the battery. This may be based on monitoring the temperature and signaling a battery charging circuit that can vary the charge rate. For example, the charging process may be begin by diverting more power to increase activity of the components and then as the device warms up, the increase in activity of the heater components is gradually reduced, in favor of gradually increasing the charge rate.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
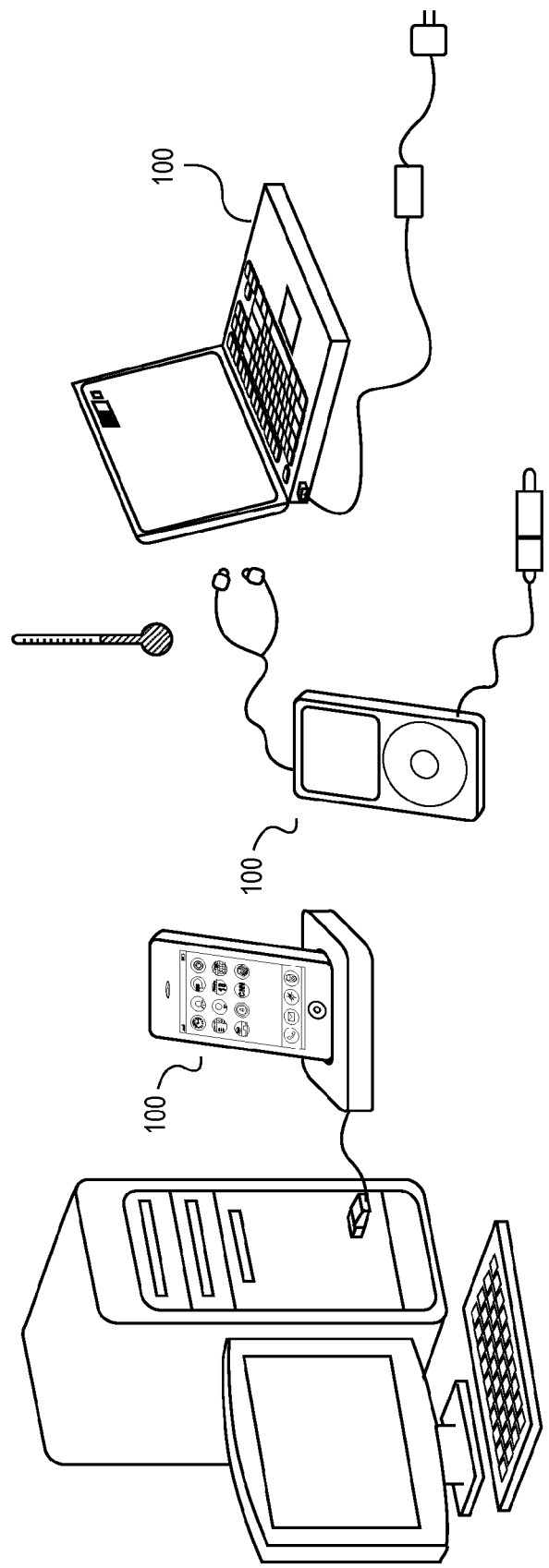
FIG. 1 shows several types of portable electronic devices in which an embodiment of the invention can be implemented.

A machine-implemented method for automatically charging the battery of a portable electronic device at low temperatures is described. FIG. 1 shows several types of portable electronic devices 100 in which an embodiment of the invention can be implemented. These are devices that can be easily carried by a person for their normal intended use. They typically include data processing, storage and display components that are integrated (e.g., embedded or otherwise made an operating part of the device) and that are powered by a battery. The term "battery" is used generically here to refer to a rechargeable power system such as a fuel cell system that can be replenished by being coupled to an external power source. The device 100 may be a consumer grade device such as a multi-function smart phone (shown as being installed into a charging cradle that is connected to a desktop personal computer), a dedicated media player (shown with a cigarette lighter charger adapter), a laptop computer (shown with an AC wall charger adapter), or a dedicated navigation device. The device 100 may be powered by a Li-ion battery or a LiPo battery. These types of batteries have a delicate chemistry in that their charge rate should be reduced significantly when cold, e.g. near freezing, to help maintain their long-term health. In accordance with an embodiment of the invention, the following method can be used to advantageously operate a device 100 that, for example, has been left in a car overnight during freezing temperatures and thus is deemed to be too cold to be charged at its battery's nominal or room temperature rate.

The device 100 detects that it is coupled to an external power source to charge its battery. In addition, it detects that it is too cold, i.e. below a battery charging threshold temperature below which the battery charge rate needs to be reduced. On that basis, the device 100 signals an increase in activity of its data processing component, data storage component, or both, to generate more heat in the device 100 to more quickly warm up the device. In other words, an increase in the power consumption of one or more of the components is signaled—this is also referred to as heating activity. This may be continued, so long as it is deemed too cold for a "normal" charge rate and so long as the device 100 is coupled to the external power source. Then, when the device 100 has warmed up sufficiently, due to the increased activity, the heating activity can be decreased or even shut down completely. In addition, the charge rate may also be increased at that point, so that the battery can more quickly reach its full charge status. Note that the entire process may be automatic, i.e. without user input (other than perhaps having to couple the device 100 to the external power source).

Figure 2:
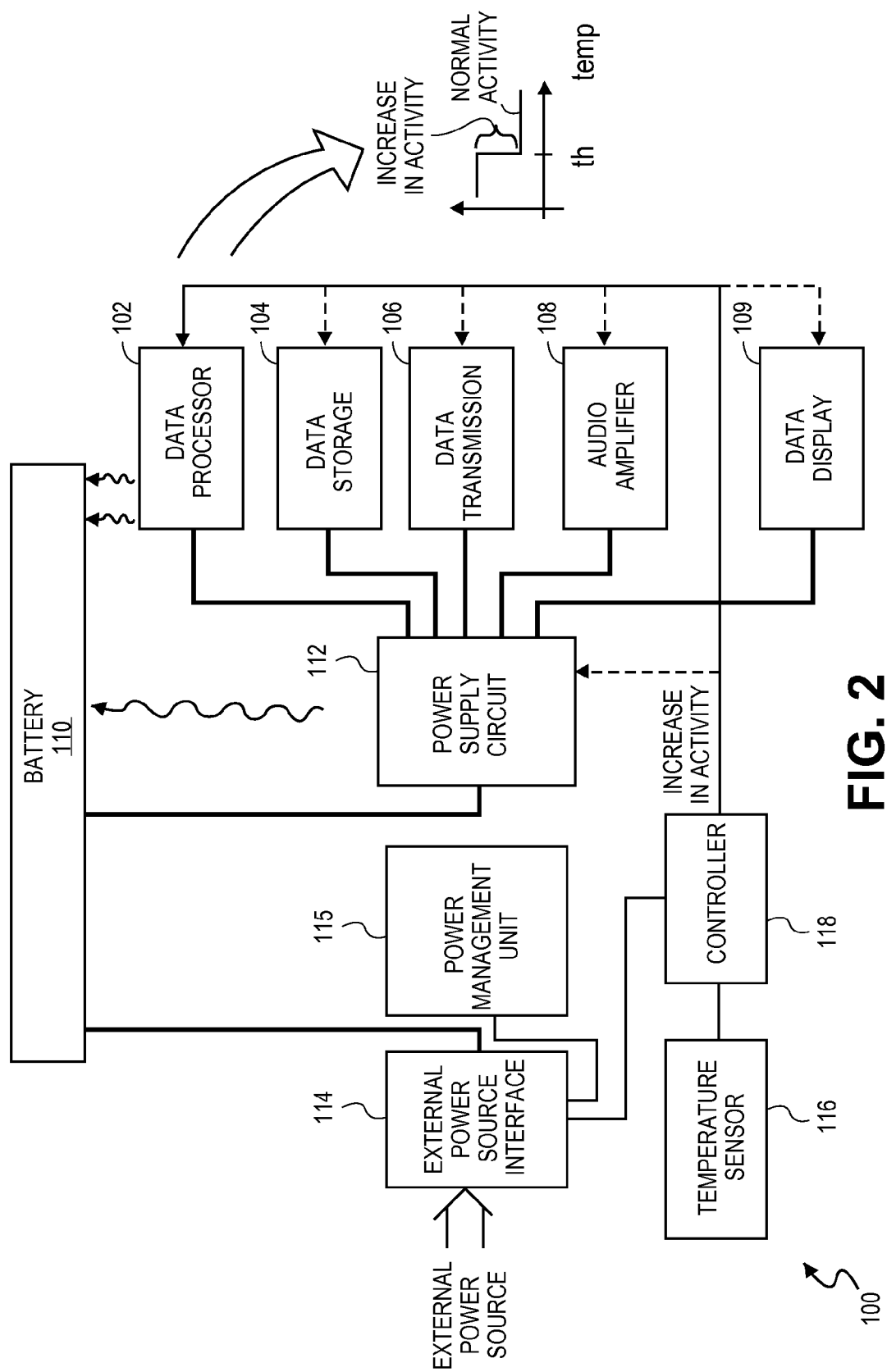
FIG. 2 is a block diagram of an example portable electronic device showing several of its relevant functional components.

Turning now to FIG. 2, a detailed look at one implementation of the above-described process is taken, based on a block diagram of an example portable electronic device 100 showing several of its relevant functional components. Note that the functional components described may be implemented in different physical forms, for purposes of improved manufacturability or other practical considerations. For example, several functional components may be integrated into a single integrated circuit (IC) chip or package, while a single functional component could be distributed across multiple IC chips or packages.

The device 100 contains a data processor 102, which may be a central processing unit (CPU), a microcontroller, a digital signal processor (DSP), an applications processor (AP), or other similar IC device that executes program code or instructions (also referred to as program modules) found in data storage 104, to perform many of the high level functions of the device 100. The storage 104 may be composed of one or more of various types of data storage media, depending upon the particular type of device 100, e.g. fixed volatile and non-volatile memory such as random access memory, removable non-volatile storage such as a flash memory card, and mass storage such as an optical or magnetic disk drive. The storage 104 may contain several program modules running on top of an operating system, including one or more of the following: a telephony application, a calendar application, a web browser, an email application, a media player application, and a map or navigation application.

To support communication with external devices, a data transmission component 106 is provided, which may include the interface circuitry needed for one or more of the following types of data transfer: a high speed serial bus such as one that complies with an Institute of Electrical and Electronics Engineers, IEEE, Standard 1349 or a Universal Serial Bus, USB, specification; a flash memory card; a subscriber identity module, SIM, card; a wired local area network, LAN, such as Ethernet; a wireless LAN; a short range wireless link such as a Bluetooth link; and a long range wireless link such as a cellular telephone network link.

The device 100 may also have an audio amplifier 108, used by sound applications in the device, to drive a built-in acoustic speaker or cable connected headset (not shown).

The device 100 also has a data display component 109 that may include a video display screen, to enable a graphical user interface for interaction with its user. Although not shown, there may also be one or more input devices such as a keyboard, touch pad, a combination display and touch screen, and a microphone, to receive input from the user.

The above-described components of the device 100 consume power supplied by a battery 110, though they are not dedicated heating elements. A power supply circuit 112 draws current from the battery 110 and supplies it to the rest of the components of the device; it may include a switching voltage regulator and/or a dc-dc converter, to maintain a regulated power supply voltage needed by the components.

A power management unit 115 is also included, to perform various conventional power management functions. These include detecting whether or not the device is coupled to an external power source, monitoring available energy in the battery 110 and reacting to it to extend battery life, and mitigating thermal situations (by for example putting selected components that are not likely to be used, such as a rotating disk drive, a display screen, an applications processor, an RF power amplifier, into their respective lower power consumption modes).

To charge the battery 110, the device 100 may be coupled to an external power source via an external power source interface 114. The latter may include a conventional battery charging circuit that can monitor the battery voltage and vary the charge rate as needed to properly and fully charge the battery 110. The term charge rate could refer to the battery charge current or the battery charging power (going into the battery). The interface 114 draws the charge current from the external power source and to do so it may contain one or more of the following types of circuitry: a plug-in ac wall outlet adapter, a plug-in dc cigarette lighter adapter (car adapter), a wireless charging circuit, and a serial bus interface charger circuit (e.g., a USB charger circuit that may actually be part of the data transmission component 106). In some instances, the interface 114 may provide relatively limited available power, e.g. a USB interface might be able to provide no more than 2.5 Watts. This available power may need to be shared between charging the battery 110 and simultaneously powering the rest of the device 100 including the functional components described above.

A process for charging the battery 110 at low temperatures needs knowledge of a temperature variable that can be associated with the battery 110. This may be obtained using one or more temperature sensors 116 in the device 100. The sensor 116 may be, for example, a thermistor or a thermocouple. The sensor 116 may be in contact with the battery 110, or it may be located close to the battery, for example on the main logic board 201. As a further alternative, there may be multiple temperature sensors that are used together to compute the temperature variable, where each of these sensors may be located on a different component of the device 100. The temperature variable may be a raw sensor output, or it may be mathematically processed or computed (e.g., interpolated or estimated) by a controller 118 based on raw output from one or more sensors 116 of the device 100.

The controller 118 is coupled to the temperature sensor 116, to detect the relevant temperature of the device 100 and compare it to a battery charging threshold temperature. The latter is a temperature (including a range) that may be specified by the manufacturer of the battery 110 as being that below which the charge rate should be reduced (perhaps even all the way down to zero), to for example maintain current or long-term health of the battery 110. If it is too cold, as revealed by the comparison, when the device 100 is coupled to the external power source (in order to begin charging), then the controller signals one of the components in the device 100 to increase its activity. The increase in activity may be essentially a jump in power consumption occurring at the threshold temperature, as depicted in FIG. 2. Alternatively, it may be a gradual increase in power consumption. In either case, the increase in activity indirectly results in the heating of one or more of the components in the device 100, which in turn increase the overall temperature of the device.

FIG. 2 also shows that the increase in activity may be targeted at the data processor 102 (such as a CPU, an applications processor, or a cellular baseband processor). Several other options are also shown, including the power supply circuit 112, data storage component 104, data transmission component 106, audio amplifier 108, and data display component 109. In fact, the choice of which electronic circuit component is to be stimulated (so as to increase the production of heat inside the device 100), is not limited to those components shown, but rather may be directed at any other functional component that does not primarily or predominantly serve as a heating element. In some cases, the power management unit 115 or even the external power source interface 114 could be signaled to increase their routine activity, so as to produce more heat. Specific examples of such stimulation include: interrupting the data processor 102 to force execution of a previously programmed subroutine or application that is particularly power consumption intensive (such as one that may involve graphics or video processing, floating point unit cycles, and other heavy digital signal processing tasks); exercising an RF transmission amplifier which may be part of the data transmission component 106; exercising the audio amplifier 108; and configuring a switching power supply circuit to intentionally operate inefficiently so as to generate more heat.

Figure 3:
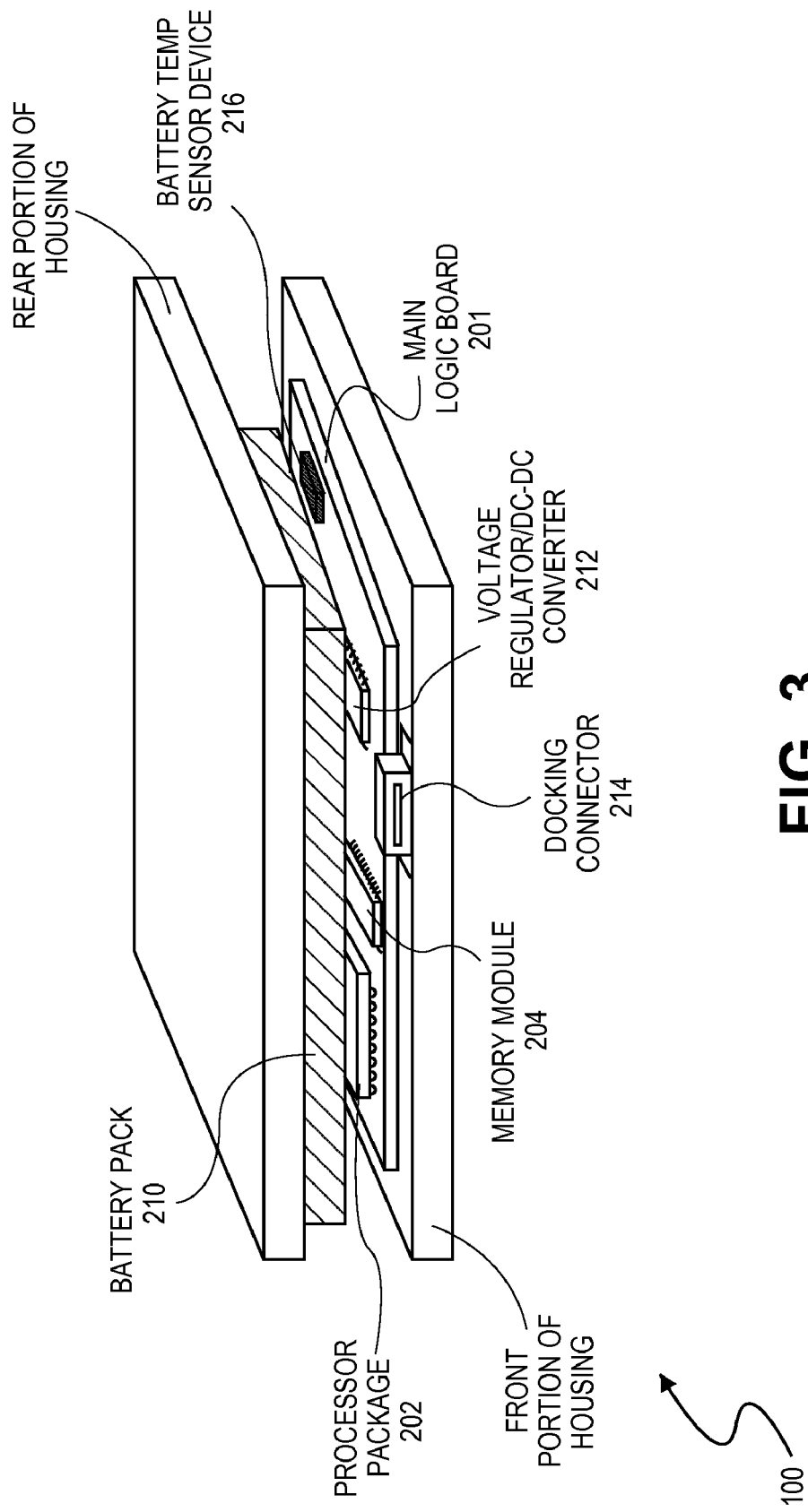
FIG. 3 is a cutaway view of an example portable electronic device showing several of its relevant physical components.

The choice of which functional components to signal for increased activity may also be based on the location or proximity of their corresponding physical components, relative to the battery 110. FIG. 3 shows a cut away view of an example portable device 100 showing several of its relevant physical components. This may be a typical arrangement, where the device 100 is composed of a housing that includes a rear portion and a front portion between which there is a stack-up of the physical components. In a typical scenario, a battery pack 210 lies closer to the rear portion of the housing, and a main logic board 201 lies closer to the front portion. The main logic board 201 may have, facing the battery pack 210, a number of relevant physical electronic circuit components installed on it, including a processor chip or package 202, a memory module 204, a voltage regulator/dc-dc converter package 212 (which may be part of a power management unit chip), and a battery temperature sensor device 216. FIG. 3 also shows an example docking connector 214. The battery charging circuitry is not shown. In such a typical arrangement, two of the components that may be selected most often for the task of acting as heater components, may be the processor package 202 and the voltage regulator/dc-dc converter 212, as these would be able to generate a substantial amount of heat when stimulated appropriately and are relatively close to the battery pack 210. The battery temperature sensor device 216 may also be installed on the main logic board but should be located relatively far from the processor package 202 and the voltage regulator/converter 212, so that it can be more effectively and independently used for detecting the temperature of the battery pack 210. Note that as an alternative, a temperature sensor device that is integrated into the battery pack may be used, to get a more direct reading of the battery pack temperature. In general, there may be other arrangements of the physical components within the device 100, relative to its battery pack 210, which may lead to a different selection of components to be used as heating elements.

Figure 4:
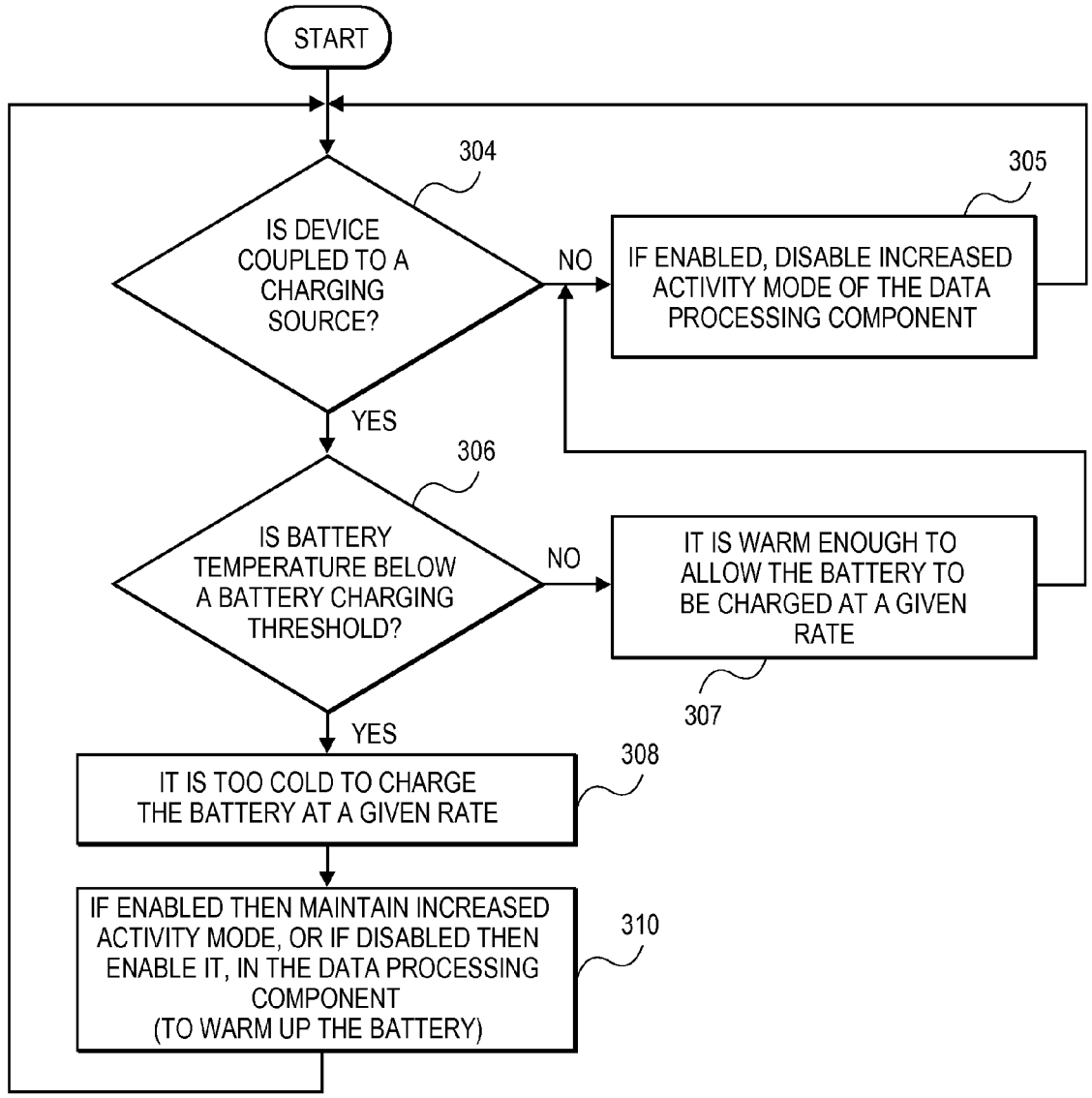
FIG. 4 is a flow diagram of an automatic low temperature battery charging process.

Turning now to FIG. 4, this is a flow diagram of an automatic, low temperature battery charging process, in accordance with an embodiment of the invention. The process may be performed by the controller 118 (see FIG. 2). The process begins with operation 304 in which it is determined whether the device 100 is coupled to an external power source, for purposes of charging the battery. Thus, in the embodiment of FIG. 2, the controller 118 would be able to, for example, poll or receive an interrupt from the external power source interface 114 as to whether or not the external power source is connected, and the charging circuit (not shown) is otherwise ready to begin charging the battery 110.

If the device 100 is not coupled to the external power source, then in operation 305, any previously signaled increase in activity is disabled. In other words, if previously enabled, the increased activity mode of a component is disabled. This action may be taken, because the battery is not about to be charged and therefore there is no need to warm up the device 100.

On the other hand, if the result of operation 304 is that the device is deemed coupled to an external power source, then the next question is whether the detected battery temperature is below a predefined charging threshold (operation 306). As explained above, this threshold may be a temperature that is specified, for example, by a manufacturer of the battery, as being one below which the charge rate should be reduced (even for instance, all the way down to zero), for example to maintain long-term health of the battery. If the result of this operation is that it is deemed warm enough to allow the battery to be charged at a given rate (condition 307), then there is no need for an increased activity mode (operation 305).

However, if the result of operation 306 is a determination that it is too cold to charge the battery at a given rate (condition 308), then the increased activity mode of one or more components is maintained if it was enabled previously (operation 310). Alternatively, if the increased activity mode had been disabled, then operation 310 enables it, so as to warm up the battery.

Thus, the foregoing process may be viewed as one where an increase in activity persists or continues to be signaled by the controller 118, so long as the temperature of the device 100 remains below a charging threshold, and the device 100 is coupled to the external power source for purposes of charging the battery.

Figure 5:
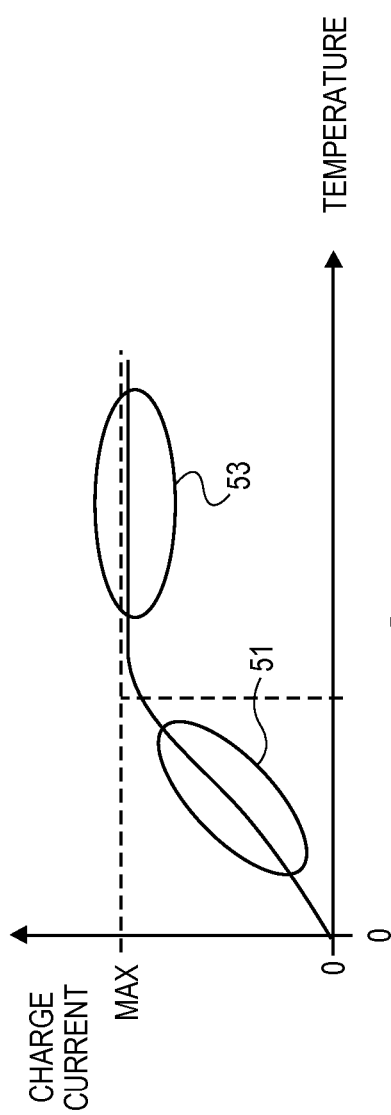
FIG. 5 is a line graph of charge current vs. temperature behavior that may be incorporated into an embodiment of the invention.

Turning now to FIG. 5, an additional aspect of an embodiment of the invention is shown, by way of a line graph showing the behavior of variable charge current vs. temperature. The ability to vary the charge current, from essentially zero, for example, all the way up to a maximum charge current, as a function of temperature, may be incorporated into the capability of the controller 118. Thus, the controller 118 monitors the temperature and on that basis responds by sending commands to the charging circuit (not shown) to vary the charge current as shown in the graph. The charge rate of the battery may thus be steadily or gradually increased as shown, as the battery warms up (within a lower temperature range 51 shown in the figure), and then the charge current essentially levels off above a threshold temperature (within an upper temperature range 53). In many instances, it would be desirable to charge the battery 110 mostly in the upper temperature range 53 (for purposes of improved battery life). The specific temperature ranges 51, 53 and associated charge current behavior may be suggested by the battery manufacturer, for example, to promote healthier battery life for long-term usage.

Figure 6:
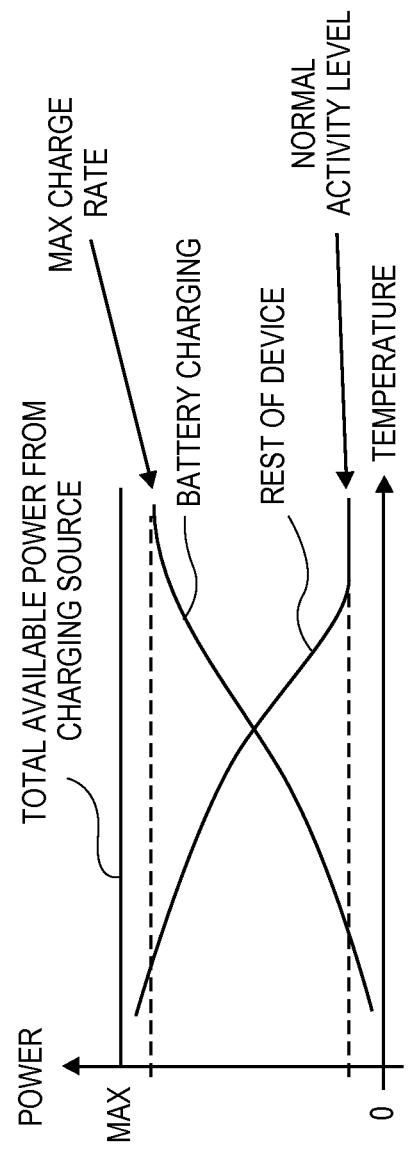
FIG. 6 is a line graph of an example variation vs. temperature of charging power in an example portable electronic device and power consumption by the rest of the device.

The above-described ability of the controller 118 to vary the battery charge may be complemented with granularity in controlling the increase in activity (that is signaled to one or more of the components that are acting as heating elements). To illustrate this aspect of the invention, FIG. 6 shows a line graph of an example variation vs. temperature of charging power and power consumption by the rest of the device. The battery charging curve, which may be similar to the one in FIG. 5, shows how the controller 118 can adjust the battery charge rate to monotonically increase it from a low temperature to a high temperature and then reach the maximum charge rate as the limit. At the same time, the increase in activity in the rest of the device 100 (relative to a "normal" activity level) is monotonically diminished.

In addition, although not shown in FIG. 5 and FIG. 6, typical charging behavior may be adopted when the temperature rises above the upper range 53 (FIG. 5), and in particular above a high or maximum threshold. For example, the charge current may be reduced, or even disabled, above 45 degrees C. (while the rest of the device 100 is allowed to operate normally or in some reduced activity mode). This may be done so as to, for instance, prevent the device 100 from becoming too hot.

In one embodiment, the controller 118 is able to adjust both the battery charging rate and the increased activity in the rest of the device simultaneously, so that at any given temperature within the operating range of the device 100, the sum of the battery charge power and the power consumed by the rest of the device remains essentially equal to the total available power from the external power source to which the device 100 is coupled. In addition, based on having detected the current temperature of the device (as relevant to the battery), the controller can vary how much of the available power (from the external power source) is used for heating (increase in activity beyond the normal level), and how much is diverted to actually charge the battery. For example, when the temperature is below a charging threshold, more of the available power may be diverted to the functional components of the device to increase their activity. Then, when the controller detects that the temperature of the device has risen about the charging threshold, it may respond by diverting more of the available power to charge the battery (than to operate the components at above their normal activity level).

To allow for instances where the battery cannot afford to give up any charge to power the rest of the device, such as when the battery is essentially empty, the controller 118 may be designed to ensure that the signaled increase in activity keeps the total power consumption by the rest of the device 100 less than the available power, so that the battery can receive at least a net positive charge. The controller may be programmed or otherwise instructed with what available power can be delivered by the external power source. It may obtain the current charge rate and the current power consumption of the rest of the device in real-time, from the charging circuit (that may be part of the external power source interface 114), the power management unit 115, and/or from the power supply circuit 112.

In sum, various embodiments of the invention have been described that automatically detects that a temperature of a portable electronic device is below a battery charging threshold, and in response signals one or more of the electronic circuit components that make up the device to enter an increased power consumption state so as to generate more heat in the device. In other words, functionality in the device, which is not dedicated or primarily intended to produce heat, has been leveraged, to yield an efficient solution for charging a battery at very low temperatures.

It may, however, be possible to incorporate a dedicated heater element into the device, for example, by incorporating a resistive heating element into the main logic board 201 or into the battery pack 210 together with the needed circuitry to drive the heating element (under control of the controller 118). However, such a circuit is considered a dedicated heating element that would not be powered by the battery at room temperature; it would essentially be idle or disabled at room temperature even though the rest of the device is active, because no additional heat would be needed to warm up the battery in that case. This is in contrast to the non-dedicated electronic circuit components described above; such components would be powered and would not be idle at room temperature, because of the functions they have to perform when the device is active.

In another embodiment, the charging rate is continuously adjusted so that it is always at a maximum permissible rate (that is, permissible in view of temperature, battery chemistry, and available power). For instance, a desired balance may be calculated between heating and charging, based on available power, temperature sensor readings, and previously determined battery charging and de-rating curves or tables (which indicate how much charge current should be de-rated when it is too cold, as a function of temperature). This allows the total time spent by a charging process (e.g., to bring the battery up to a full state of charge) to be minimized.

Figure 7:
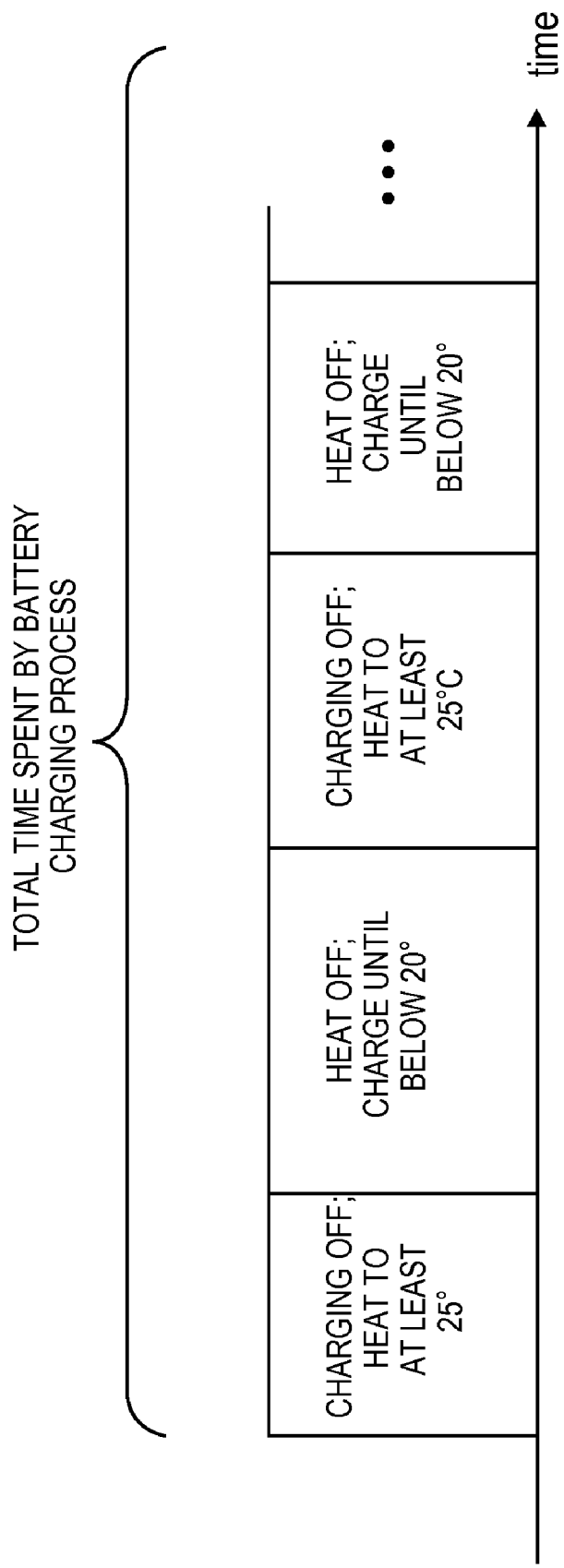
FIG. 7 is a diagram of an example battery charging process in which heating only and charging only phases are repeated.

In another embodiment, the total time spent for charging the battery may be minimized by alternating between heating only and charging only phases. This is depicted by the example diagram of FIG. 7. The available power is used for heating and not charging during one time interval or phase, until the temperature reaches a given upper threshold. In the next time interval, the available power is used for charging and not heating, until the temperature drops below a lower threshold (because the device 100 may be in a particularly cold environment). These phases may then repeat in this manner until the battery has reached its full charge state. Of course, if at some point in the process the temperature stays above the lower threshold (e.g., because the environment is warming), then no more of the heating phases may be needed. Note that the specific upper and lower temperature thresholds of 25 and 20 degrees, respectively, given in FIG. 7 are just examples and are not intended to limit the scope of the invention.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although FIG.

2 depicts the controller 118 as a block that is separate from the data processor component 102, it is apparent to one of ordinary skill in the art that much, if not all, of the capability of the controller 118 in terms of digital processing of temperature, battery charge rate, and overall power consumption by the rest of the device, may be performed by suitably programming, for example, an applications processor that may be deemed to be part of the data processor component 102. In that case, the controller 118 could be a programmed application processor that would stimulate itself, to warm up the battery 110. In addition, although an immediate application of the techniques described above is for the low temperature charging of portable device batteries that have Li-ion or lithium polymer chemistries, future batteries that have different chemistries may also benefit from these techniques. The description is thus to be regarded as illustrative instead of limiting.

What is claimed is:

1. A machine-implemented method for operating a portable electronic device having therein a data processing component and a battery, comprising:
   (a) detecting that the device is coupled to an external power source to charge the battery;
   (b) detecting that a temperature of the device is below a battery charging threshold below which charge rate of the battery is reduced; and
   (c) signaling an increase in data processing activity of the data processing component based on (a) and (b), to cause the data processing component to generate heat in the device to raise the temperature of the device to above the battery charging threshold.

2. The method of claim 1 further comprising:
   increasing the charge rate of the battery in response to the temperature having risen.

3. The method of claim 1 further comprising:
   continuing to signal an increase in activity, so long as the device is coupled to the external power source to charge the battery, wherein the increase in data processing activity of the data processing component is powered by the external power source.

4. The method of claim 1 further comprising:
   comparing the sum of (a) charge rate of the battery and (b) power consumption by the rest of the device, with (b) available power from the external power source; and
   signaling a decrease in activity of the data processing component, based on the comparison.

5. The method of claim 1 further comprising:
   adjusting the increase in activity so that power consumption by the rest of the device remains less than available power from the external power source.

6. The method of claim 1 further comprising:
   adjusting the increase in activity so that the battery receives a net positive charge, despite increased power consumption by the data processing component.

7. The machine implemented method of claim 1, wherein the increased data processing activity includes forcing a data processor to execute the previously programmed digital data subroutine or application that is particularly power consumption intensive, forcing an RF transmission amplifier to transmit digital data, forcing an audio amplifier to exercise digital data amplification, or forcing a DC-DC power convertor to operate inefficiently to generate the sufficient amount of heat that raises the temperature of the device to above the battery charging threshold.

8. The machine implemented method of claim 1, wherein the increased data processing activity includes:
   interrupting the data processing component; and
   forcing the data processing component to execute a previously programmed application that is particularly power consumption intensive.

9. A portable electronic device comprising:
   a battery;
   a plurality of components coupled to be powered by the battery, said plurality of components include a digital data signal processing component, a digital data information signal storage component, a digital data information signal transmission component, a digital data amplification component, and a dc-dc power converter component;
   an interface to be coupled to, and thereby obtain available power from, an external power source; and
   a controller to detect temperature of the device as being below a battery charging threshold while the interface is coupled to the external power source, and in response signal one of the plurality of components to increase its digital data processing or power conversion activity to produce a sufficient amount of heat that can raise the temperature of the device to above the battery charging threshold.

10. The device of claim 9 further comprising a charging circuit that can provide charge current to the battery, wherein the controller is to signal the charging circuit to increase the charge current as the temperature of the device increases.

11. The device of claim 9 wherein the controller is to diminish the increase in activity as the temperature of the device increases.

12. The device of claim 9 wherein the controller is to vary how much of said available power is used in the increase in activity and how much is diverted to charge the battery, based on having detected a temperature of the device, wherein the increase in activity of the component is powered by the external power source.

13. The device of claim 12 wherein the controller is to (a) divert more of said available power to power the plurality of components than to charge the battery, to generate more heat in the device through the increase in activity, then (b) detect that a temperature of the device has increased above the battery charging threshold, and then (c) in response to (b), divert more of said available power to charge the battery than to power the plurality of components.

14. A portable electronic device comprising:
   a battery;
   a plurality of electronic circuit components coupled to be powered by the battery, said plurality of electronic circuit components include a digital data information signal storage component, a digital data information signal transmission component, a digital data amplification component, and a dc-dc power converter component; and
   a controller to detect temperature of the device as being below a battery charging threshold, and in response signal one of the electronic circuit components to enter an increased processing or power conversion power consumption state to produce a sufficient amount of heat that can raise the temperature of the device to above the battery charging threshold.

15. The portable electronic device of claim 14 wherein the controller is to detect temperature of the device as being above the battery charging threshold and in response signal the one of the components to enter a decreased power consumption state.

16. The portable electronic device of claim 14 wherein the controller is to signal more than one of the plurality of components to enter their increased power consumption states.

17. The portable electronic device of claim 14 wherein the components are an application processor and a voltage regulator or voltage converter.

18. The portable electronic device of claim 14, wherein signaling comprises continuing to signal so long as a temperature of the device remains below the threshold.

19. The portable electronic device of claim 14, wherein signaling comprises continuing to signal for the increase power consumption state to persist so long as the temperature of the device remains below the threshold, and so long as the device is coupled to an external power source for a purpose of charging the battery.

20. The portable electronic device of claim 14, wherein signaling an increase in activity of one of the electronic circuit components is also based on the proximity of the battery to the one of the electronic circuit components and heat generated by the data processing component is sufficient to cause the temperature of the device to increase to above the threshold.

21. A portable electronic device comprising:
a controller to charge a battery of the device using available power from an external power source, the controller to control a process for charging the battery by alternating between a heating phase and a charging phase, wherein in the heating phase the available power is mostly used to increase processing or power conversion activity of an electronic circuit component of the device and not charge the battery, said electronic circuit component being one of the group consisting of an information signal storage component, an information signal transmission component, an amplification component, and a power supply component, and in the charging phase the available power is mostly used to charge the battery and not increase activity of said electronic circuit component to produce a sufficient amount of heat that can raise the temperature of the device to above a battery charging threshold.

22. The machine-implemented method of claim 1, wherein signaling comprises continuing to signal so long as a temperature of the device remains below the threshold.

23. The machine-implemented method of claim 1, wherein signaling comprises continuing to signal for the increase in activity to persist so long as the temperature of the device remains below the threshold, and so long as the device is coupled to the external power source for a purpose of charging the battery.

24. The machine-implemented method of claim 1, wherein signaling an increase in activity of the data processing component is also based on the proximity of the battery to the data processing component and heat generated by the data processing component is sufficient to cause the temperature of the device to increase to above the threshold.

25. The portable electronic device of claim 21, further comprising continuing to signal the heating phase so long as a temperature of the device remains below the threshold.

26. The portable electronic device of claim 25, wherein signaling comprises continuing to signal for the increase power consumption state to persist so long as the temperature of the device remains below the threshold, and so long as the device is coupled to an external power source for a purpose of charging the battery.

27. The portable electronic device of claim 25, wherein signaling an increase in activity of one of the electronic circuit components is also based on the proximity of the battery to the one of the electronic circuit components and heat generated by the data processing component is sufficient to cause the temperature of the device to increase to above the threshold.

* * * * *